United States Patent
Yasui et al.

(10) Patent No.: US 11,420,601 B2
(45) Date of Patent: Aug. 23, 2022

(54) VEHICLE STOPPAGE ASSISTANCE APPARATUS

(71) Applicant: ADVICS CO., LTD., Kariya (JP)

(72) Inventors: Takuya Yasui, Nagoya (JP); Yosuke Hashimoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 258 days.

(21) Appl. No.: 16/628,871

(22) PCT Filed: Jul. 26, 2018

(86) PCT No.: PCT/JP2018/028009
§ 371 (c)(1),
(2) Date: Jan. 6, 2020

(87) PCT Pub. No.: WO2019/022173
PCT Pub. Date: Jan. 31, 2019

(65) Prior Publication Data
US 2020/0223407 A1    Jul. 16, 2020

(30) Foreign Application Priority Data
Jul. 26, 2017   (JP) .............................. JP2017-144869

(51) Int. Cl.
*B60T 7/22* (2006.01)
*G01C 22/02* (2006.01)

(52) U.S. Cl.
CPC ................ *B60T 7/22* (2013.01); *G01C 22/02* (2013.01); *B60T 2201/022* (2013.01);
(Continued)

(58) Field of Classification Search
None
See application file for complete search history.

(56) References Cited

U.S. PATENT DOCUMENTS

| 7,158,015 B2* | 1/2007 | Rao ...................... B60Q 9/006 340/428 |
| 7,187,273 B2* | 3/2007 | Rieck ................... B60C 23/061 340/443 |

(Continued)

FOREIGN PATENT DOCUMENTS

JP    2012-144158 A    8/2012

OTHER PUBLICATIONS

International Search Report dated Sep. 25, 2018 in PCT/JP2018/028009 filed on Jul. 26, 2018.

*Primary Examiner* — Todd Melton
(74) *Attorney, Agent, or Firm* — Oblon, McClelland, Maier & Neustadt, L.L.P.

(57) ABSTRACT

A control device is provided with: a moving distance estimation unit that calculates an estimated value of a vehicle moving distance on the basis of a pulse signal inputted from a wheel speed sensor and a wheel dynamic load radius stored in a storage unit; a moving distance deriving unit that derives the calculated value of the vehicle moving distance on the basis of information acquired by monitoring systems; a vehicle stop position setting unit that sets a target vehicle stop position on the basis of the information acquired by the monitoring systems; a correction unit that corrects the target vehicle stop position on the basis of the calculated value of the moving distance and the estimated value of the moving distance; and a brake control unit that assists vehicle stoppage so as to stop the vehicle when it is determined that the vehicle has reached the target vehicle stop position on the basis of the vehicle moving distance calculated from a wheel rotation amount and the target vehicle stop position.

16 Claims, 4 Drawing Sheets

(52) U.S. Cl.
CPC ....... *B60T 2210/32* (2013.01); *B60T 2240/00* (2013.01); *B60T 2250/04* (2013.01)

(56) References Cited

U.S. PATENT DOCUMENTS

| | | | |
|---|---|---|---|
| 9,719,886 B2* | 8/2017 | Luk | B60C 23/04 |
| 9,878,721 B2* | 1/2018 | Singh | B60C 23/0408 |
| 10,442,465 B2* | 10/2019 | Dhome | G05D 1/0257 |
| 10,759,415 B2* | 9/2020 | Litkouhi | B60W 40/12 |
| 2013/0282252 A1 | 10/2013 | Takagi et al. | |

\* cited by examiner

VEHICLE STOPPAGE ASSISTANCE APPARATUS

TECHNICAL FIELD

The present invention relates to a vehicle stoppage assistance apparatus that assists the stoppage of the vehicle.

BACKGROUND ART

Patent Literature 1 describes an example of a vehicle stoppage assistance apparatus that automatically stops a vehicle on the basis of information obtained by a monitoring system when an obstacle is detected by the monitoring system that monitors the rear side of the vehicle. In such stoppage assistance apparatus, the distance between the obstacle detected by the monitoring system and the vehicle is calculated based on the information obtained by the monitoring system. Then, when the calculated value of the distance between the obstacle and the vehicle becomes less than or equal to a target stop distance, stop control is performed to increase the braking force on the vehicle in order to stop the vehicle.

Furthermore, in the stoppage assistance apparatus described above, when the monitoring system loses sight of the obstacle, the moving distance of the vehicle is estimated based on the output signal from a wheel speed sensor. That is, the estimated value of the moving distance of the vehicle is calculated based on the diameter of the wheel mounted on the vehicle and the rotation amount of the wheel per unit time calculated based on the detection signal from the wheel speed sensor. Then, an estimated value of the distance between the vehicle and the obstacle is calculated based on the calculated estimated value of the moving distance of the vehicle. When the estimated value of the distance between the vehicle and the obstacle becomes less than or equal to the target stop distance, the stop control is performed.

CITATIONS LIST

Patent Literature

Patent Literature 1: Japanese Unexamined Patent Application Publication No. 2012-144158

SUMMARY OF INVENTION

Technical Problems

When the tire provided on the wheel is replaced, the wheel diameter may change. The diameter of the wheel also changes when tire wear progresses. In such a case, since the actual diameter of the wheel of the vehicle is different from the diameter of the wheel of the vehicle stored in the memory of the stoppage assistance apparatus, the estimated value of the moving distance of the vehicle calculated using the diameter of the wheel is deviated from the actual value of the moving distance of the vehicle. As a result, when such an estimated value of the moving distance of the vehicle is used, the stop control is started at a timing different from the timing at which the stop control should be originally started.

Furthermore, as a vehicle stoppage assistance apparatus, there is an apparatus that, when determined that the vehicle has reached the target vehicle stop position which is the target of the stop position using the estimated value of the moving distance of the vehicle calculated using the diameter of the wheel, requests a driver of the vehicle to perform the braking operation. Even in such apparatus, when the estimated value of the moving distance of the vehicle is deviated from the actual value of the moving distance of the vehicle, the braking operation is requested to the driver at a timing different from the timing at which the braking operation is originally requested to the driver.

That is, in the apparatus that assists the stoppage of the vehicle using the output signal from the wheel speed sensor, there is room for improvement in reducing the deviation generated between the position where the vehicle is originally intended to be stopped and the actual stop position of the vehicle.

Solutions to Problems

A vehicle stoppage assistance apparatus for solving the problems described above is an apparatus applied to a vehicle including a monitoring system that monitors a periphery of the vehicle, and a wheel speed sensor that outputs a pulse signal corresponding to a rotated angle of a wheel. The vehicle stoppage assistance apparatus includes a storage unit that stores a radius of the wheel or a correlation value of the radius; a moving distance estimation unit that calculates an estimated value of a moving distance of the vehicle in a specified time based on number of pulses included in the pulse signal input from the wheel speed sensor within the specified time and the radius of the wheel; a moving distance deriving unit that derives a calculated value of the moving distance of the vehicle in the specified time based on information obtained by the monitoring system; a vehicle stop position setting unit that sets a target vehicle stop position which is a target of a stop position of the vehicle based on the information obtained by the monitoring system; a correction unit that corrects the target vehicle stop position set by the vehicle stop position setting unit toward a side of moving closer to the vehicle when the calculated value of the moving distance is greater than the estimated value of the moving distance, and corrects the target vehicle stop position toward a side of moving away from the vehicle when the calculated value of the moving distance is smaller than the estimated value of the moving distance; and an assistance control unit that performs a stoppage assistance control of assisting stoppage of the vehicle so that the vehicle stops when determined that the vehicle has reached the target vehicle stop position based on the moving distance of the vehicle calculated on a basis of a pulse signal input from the wheel speed sensor and the target vehicle stop position.

When the radius of the wheel used to calculate the estimated value of the moving distance of the vehicle at the specified time is different from the actual radius of the wheel, the estimated value of the moving distance of the vehicle calculated based on the pulse signal and the radius of the wheel is deviated from the calculated value of the moving distance of the vehicle derived based on the information obtained by the monitoring system. Therefore, in the above configuration, the target vehicle stop position set based on the information obtained by the monitoring system is corrected using the difference obtained by subtracting the calculated value of the moving distance of the vehicle from the estimated value of the moving distance of the vehicle. The stoppage assistance control is performed so that the vehicle stops when determined that the vehicle has reached the target vehicle stop position based on the corrected target vehicle stop position and the moving distance of the vehicle calculated based on the pulse signal. Therefore, even if the radius of the wheel used to calculate the estimated value of the moving distance of the vehicle is different from the actual radius of the wheel, the deviation between the position where the vehicle is originally intended to be stopped and the actual stop position of the vehicle is suppressed from increasing.

DESCRIPTION OF EMBODIMENTS

Hereinafter, one embodiment embodying a vehicle stoppage assistance apparatus will be described with according to FIGS. 1 to 5.

Figure 1:
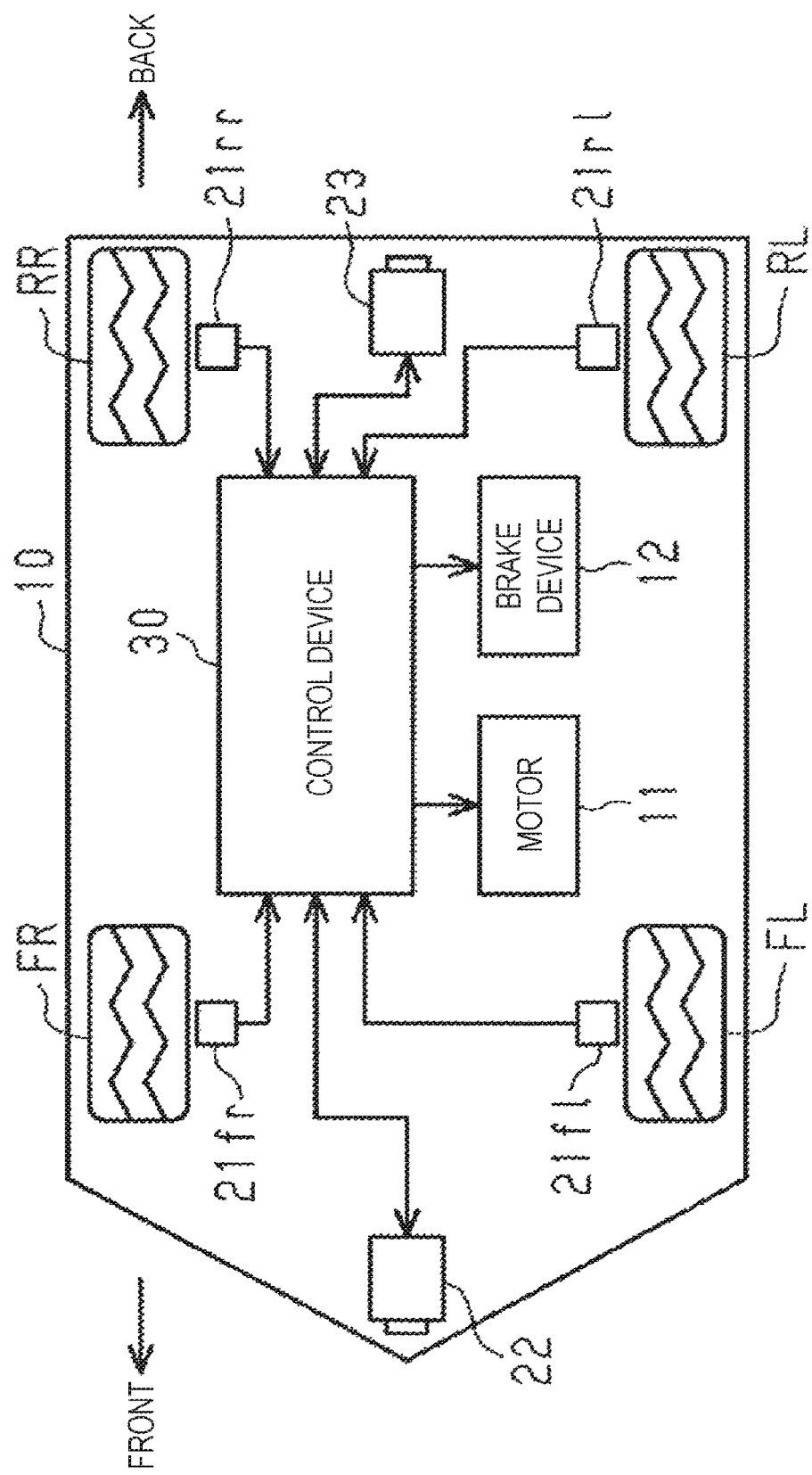
FIG. 1 is a configuration view showing an outline of a vehicle equipped with a control device serving as one embodiment of a vehicle stoppage assistance apparatus.

FIG. 1 shows a vehicle 10 equipped with a control device 30 which is an example of a stoppage assistance apparatus in accordance with the present embodiment. As shown in FIG. 1, the vehicle 10 includes a motor 11 that functions as a power source of the vehicle 10, and a brake device 12 that operates to adjust the braking force on the vehicle 10. When the vehicle 10 is traveled based on the set target speed, the vehicle body speed VS of the vehicle 10 can be brought close to the target speed by coordinating the motor 11 and the brake device 12.

Figure 2:
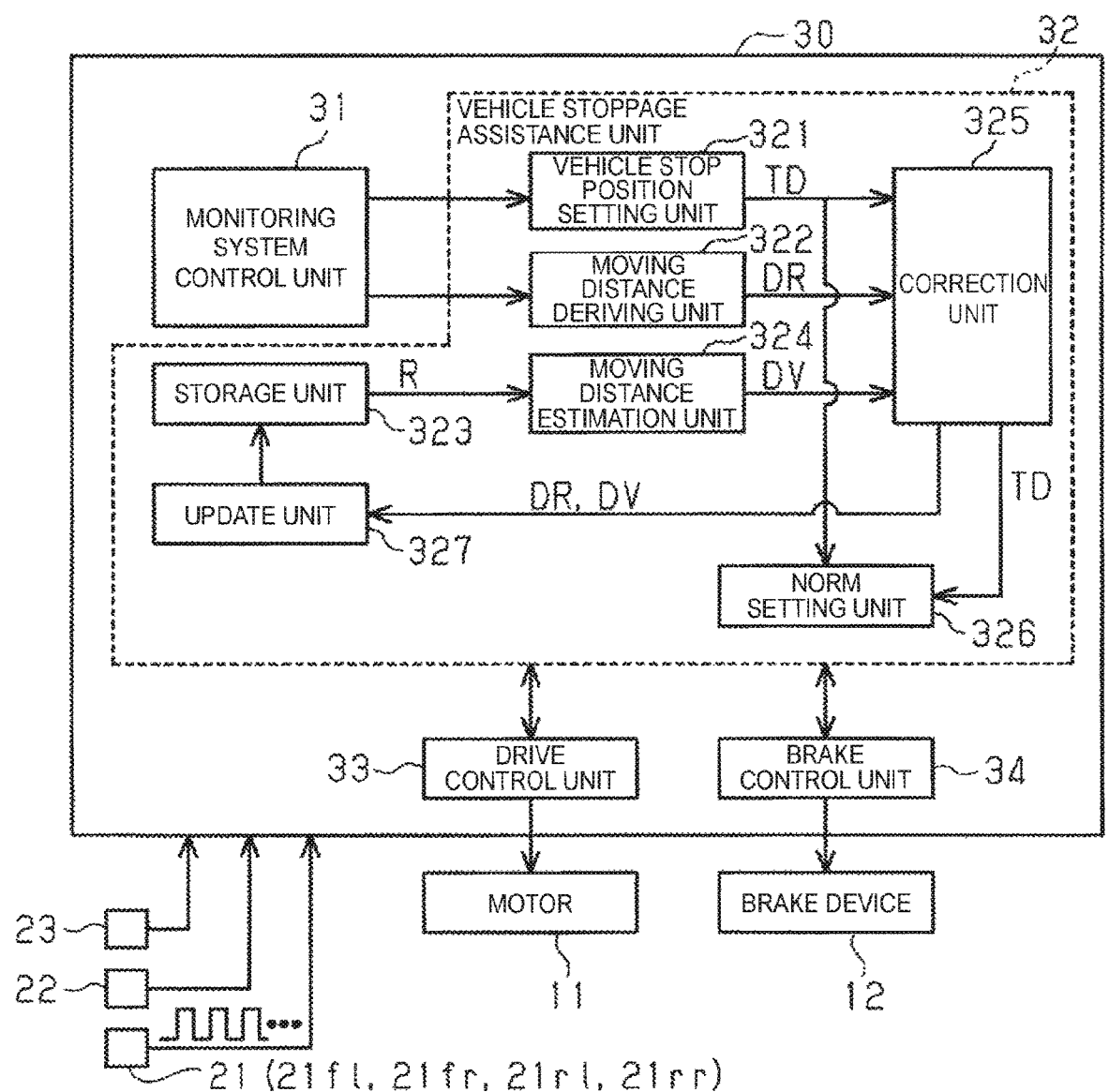
FIG. 2 is a block diagram showing a functional configuration of the control device.

As shown in FIGS. 1 and 2, the vehicle 10 is provided with a plurality of wheel speed sensors 21*fl*, 21*fr*, 21*rl*, 21*rr* that individually correspond to the four wheels FL, FR, RL, RR. The wheel speed sensors 21*fl*, 21*fr*, 21*rl*, and 21*rr* output a pulse signal corresponding to the rotated angles of the wheels FL, FR, RL, and RR to the control device 30. The wheel speed sensor includes, for example, a sensor combining a gear-shaped metal rotor and an electromagnetic pickup that has been widely used conventionally, a sensor combining a magnetic body and a Hall element, a resolver, and a detection system that detects the rotated angle of an electric motor connected to the wheel by a ripple current and the like. Such wheel speed sensors all correspond to "wheel speed sensors that output pulse signals corresponding to the rotated angle of the wheels".

Furthermore, the vehicle 10 is provided with a front monitoring system 22 that monitors the front side of the vehicle 10 and a rear monitoring system 23 that monitors the rear side of the vehicle 10 as the monitoring system for monitoring the periphery of the vehicle 10. The front monitoring system 22 outputs information obtained by monitoring the front side of the vehicle 10 to the control device 30, and the rear monitoring system 23 outputs information obtained by monitoring the rear side of the vehicle 10 to the control device 30. Examples of the monitoring systems 22 and 23 include, for example, imaging devices such as a laser radar, a millimeter wave radar, a camera, and the like.

The control device 30 of the present embodiment is provided with a function of assisting the stoppage of the vehicle 10. For example, when the vehicle 10 is moving backward, the target vehicle stop position TD which is the target of the stop position of the vehicle 10 is set based on the information obtained by the rear monitoring system 23. Then, the braking force on the vehicle 10 is adjusted by the operation of the brake device 12 so that the vehicle 10 automatically stops when it can be determined that the vehicle 10 has reached the target vehicle stop position TD. Furthermore, when the vehicle 10 is moving forward, the target vehicle stop position TD is set based on the information obtained by the front monitoring system 22. Then, the braking force on the vehicle 10 is adjusted by the operation of the brake device 12 so that the vehicle 10 automatically stops when it can be determined that the vehicle 10 has reached the target vehicle stop position TD.

As shown in FIG. 2, the control device 30 includes a monitoring system control unit 31, a vehicle stoppage assistance unit 32, a drive control unit 33, and a brake control unit 34 as functional units for assisting the stoppage of the vehicle 10.

When the vehicle 10 is moving backward, the monitoring system control unit 31 determines whether or not an obstacle (e.g., other vehicles, buildings such as walls, etc.) exists in an advancing direction of the vehicle 10 based on the information obtained by the rear monitoring system 23. Furthermore, when the vehicle 10 is moving forward, the monitoring system control unit 31 determines whether or not an obstacle exists in the advancing direction of the vehicle 10 based on the information obtained by the front monitoring system 22. When determined that there is an obstacle, the monitoring system control unit 31 calculates the relative speed of the vehicle 10 with respect to the obstacle, the distance between the obstacle and the vehicle 10, and the like.

Note that the monitoring system control unit 31 takes time to analyze the information obtained by the monitoring systems 22 and 23. Therefore, a first control cycle CS1, which is a cycle for calculating the relative speed of the vehicle 10 and the distance between the obstacle and the vehicle 10 in the monitoring system control unit 31, is longer than a second control cycle CS2, which is a cycle for various calculations such as the calculation of a wheel speed using a pulse signal from the wheel speed sensors 21*fl*, 21*fr*, 21*rl*, 21*rr*.

The vehicle stoppage assistance unit 32 includes a vehicle stop position setting unit 321, a moving distance deriving unit 322, a storage unit 323, a moving distance estimation unit 324, a correction unit 325, a norm setting unit 326, and an update unit 327.

Figure 3:
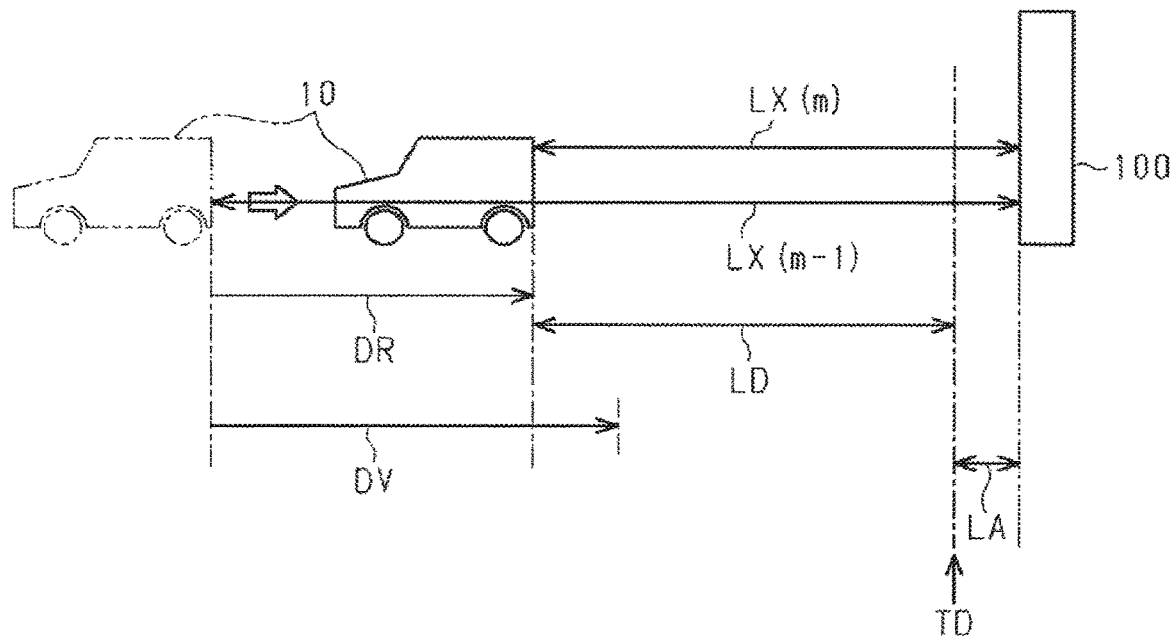
FIG. 3 is a schematic view showing a positional relationship between a vehicle moving backward and an obstacle.

The vehicle stop position setting unit 321 sets the target vehicle stop position TD based on the result of the monitoring system control unit 31 analyzing the information obtained by the monitoring systems 22 and 23. For example, as shown in FIG. 3, the vehicle stop position setting unit 321 sets a position before the position of the obstacle 100 by a specified distance LA as the target vehicle stop position TD. Note that FIG. 3 shows a case where the vehicle 10 is moved backward.

The vehicle stop position setting unit 321 can set the target vehicle stop position TD even when the monitoring systems 22 and 23 do not detect the obstacle 100. For example, when the monitoring system 22 or 23 detects that the signal is a red signal, the vehicle stop position setting unit 321 can set the target vehicle stop position TD based on a stop line on the road detected by the monitoring systems 22 and 23.

Returning to FIG. 2, the moving distance deriving unit 322 derives a calculated value DR of the moving distance of the vehicle 10 at the specified time TMA based on the result of the monitoring system control unit 31 analyzing the information obtained by the monitoring systems 22 and 23. For example, as shown in FIG. 3, the moving distance deriving unit 322 can set a difference between the latest value LX (m) of the distance between the obstacle 100 and the vehicle 10 and the distance LX (m−1) between the obstacle 100 and the vehicle 10 before the current time point by the specified time TMA as the calculated value DR of the moving distance of the vehicle 10 at the specified time TMA. In the following description, the calculated value DR of the moving distance of the vehicle 10 at the specified time TMA is simply referred to as "the calculated value DR of the moving distance of the vehicle 10".

Here, the specified time TMA is a time longer than the first control cycle CS1. For example, the specified time TMA is set to a value that satisfies both a product obtained by multiplying a coefficient F1 to the first control cycle CS1 and a product obtained by multiplying a coefficient F2 to the second control cycle CS2. However, each of the coefficients F1 and F2 is a positive number of greater than or equal to "1", and the coefficient F2 is larger than the coefficient F1.

Returning to FIG. 2, the storage unit 323 stores a dynamic load radius R of the specified wheel, which is the wheel used for the process in the moving distance estimation unit 324, among the wheels FL, FR, RL, and RR. In the following description, the wheel speed sensor for the specified wheel of the wheel speed sensors 21fl, 21fr, 21rl, and 21rr is referred to as "the specified wheel speed sensor 21". For example, when the specified wheel is the left rear wheel RL, the wheel speed sensor 21r for the left rear wheel RL corresponds to the specified wheel speed sensor 21.

The moving distance estimation unit 324 calculates an estimated value DV of the moving distance of the vehicle 10 at the specified time TMA based on the pulse signal output from the specified wheel speed sensor 21 and the dynamic load radius R of the specified wheel stored in the storage unit 323. For example, the moving distance estimation unit 324 can calculate the estimated value DV of the moving distance of the vehicle 10 at the specified time TMA by using the following relational expression (equation 1).

[Equation 1]

$$DV = 2 \cdot \pi \cdot R \cdot \frac{Pn}{N} \quad \text{(Equation 1)}$$

In the relational expression (equation 1), "Pn" is the number of pulses that can be detected from the pulse signal input from the specified wheel speed sensor 21 within the specified time TMA (e.g., the number of rising edges included in the pulse signal). Furthermore, "N" is a value fixed at the specified value obtained from the specifications of the specified wheel speed sensor 21, and is the total number of pulses included in the pulse signal output from the specified wheel speed sensor 21 until the specified wheel makes one rotation (e.g., total number of rising edges). That is, since the pulse can be detected every time the wheel rotates "360/N degrees", "Pn" corresponds to the rotation amount of the specified wheel within the specified time TMA, and "N" corresponds to the rotation amount of the specified wheel when the specified wheel makes one rotation. Therefore, it can also be said that the estimated value DV of the moving distance of the vehicle 10 at the specified time TMA calculated here is a value calculated based on the rotation amount of the specified wheel at the specified time TMA. In the following description, the estimated value DV of the moving distance of the vehicle 10 at the specified time TMA is simply referred to as "the estimated value DV of the moving distance of the vehicle 10".

The correction unit 325 corrects the target vehicle stop position TD set by the vehicle stop position setting unit 321 based on the calculated value DR of the moving distance of the vehicle 10 derived by the moving distance deriving unit 322 and the estimated value DV of the moving distance of the vehicle 10 calculated by the moving distance estimation unit 324. That is, the correction unit 325 corrects the target vehicle stop position TD to the side of moving away from the vehicle 10 when the calculated value DR of the moving distance of the vehicle 10 is smaller than the estimated value DV of the moving distance of the vehicle 10 as shown in FIG. 3, On the other hand, the correction unit 325 corrects the target vehicle stop position TD to the side of moving closer to the vehicle 10 when the calculated value DR of the moving distance of the vehicle 10 is larger than the estimated value DV of the moving distance of the vehicle 10.

Returning to FIG. 2, the norm setting unit 326 creates a profile PR of the moving distance of the vehicle 10 until the vehicle 10 reaches the target vehicle stop position TD set by the vehicle stop position setting unit 321 or the target vehicle stop position TD corrected by the correction unit 325. That is, the norm setting unit 326 creates a profile PR of the moving distance of the vehicle 10 as shown in FIG. 4.

Figure 4:
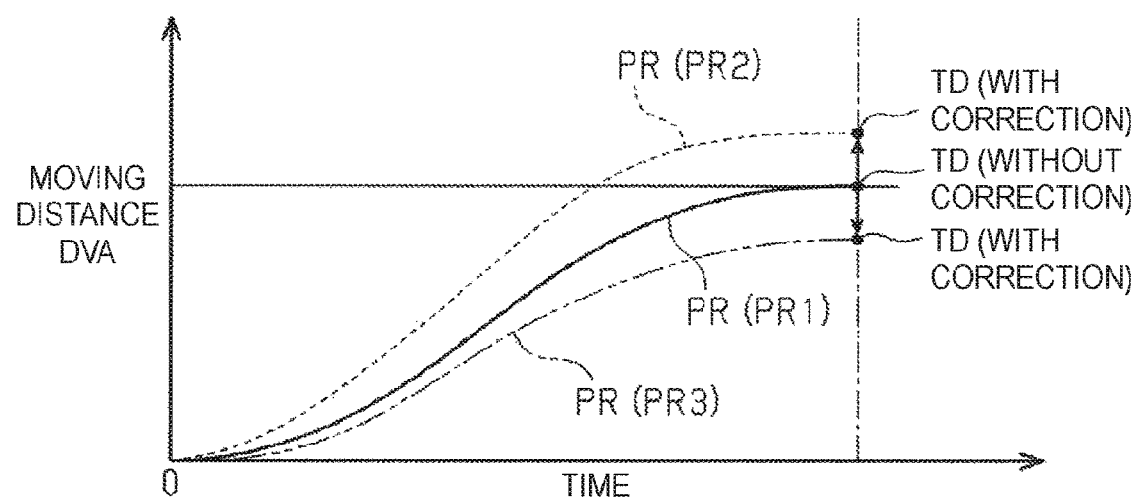
FIG. 4 is a view showing a profile of a moving distance of a vehicle until reaching a target vehicle stop position.

FIG. 4 shows a profile PR of the moving distance of the vehicle 10 from the time point when the target vehicle stop position TD is determined. The moving distance DVA of the vehicle 10 referred to herein is a value that can be calculated based on the pulse signal output from the specified wheel speed sensor 21 and the dynamic load radius R of the specified wheel stored in the storage unit 323. The solid line in FIG. 4 is a profile PR1 of the moving distance of the vehicle 10 when the vehicle 10 is stopped at the target vehicle stop position TD set by the vehicle stop position setting unit 321. The broken line in FIG. 4 is a profile PR2 of the moving distance of the vehicle 10 when the vehicle 10 is stopped at the corrected target vehicle stop position TD when the target vehicle stop position TD set by the vehicle stop position setting unit 321 is corrected toward a side of moving away from the vehicle 10. The two-dot chain line in FIG. 4 is a profile PR3 of the moving distance of the vehicle 10 when the vehicle 10 is stopped at the corrected target vehicle stop position TD when the target vehicle stop position TD set by the vehicle stop position setting unit 321 is corrected toward a side of moving closer to the vehicle 10.

Returning to FIG. 2, the update unit 327 updates the storage content of the storage unit 323, that is, the dynamic load radius R of the specified wheel based on the calculated value DR of the moving distance of the vehicle 10 derived by the moving distance deriving unit 322 and the estimated value DV of the moving distance of the vehicle 10 calculated by the moving distance estimation unit 324.

The drive control unit 33 drives the motor 11 so that the vehicle 10 travels according to the profile PR of the moving distance of the vehicle 10 set by the norm setting unit 326.

The brake control unit 34 operates the brake device 12 so that the vehicle 10 travels according to the profile PR of the moving distance of the vehicle 10 set by the norm setting unit 326. Furthermore, when determined that the vehicle 10 has reached the target vehicle stop position TD, the brake control unit 34 performs the stop control to stop the vehicle 10 by increasing the braking force on the vehicle 10 by the operation of the brake device 12. In the present embodiment, the stop control corresponds to an example of "stoppage assistance control" that assists the stoppage of the vehicle 10. Therefore, the brake control unit 34 that performs stop control functions as an example of "assistance control unit" that performs stoppage assistance control of assisting the stoppage of the vehicle 10 so that the vehicle 10 comes to a stop when determined that the vehicle 10 has reached the target vehicle stop position TD.

Next, a processing routine executed when automatically stopping the vehicle 10 traveling at a low speed will be described with reference to FIG. 5. The present processing routine is executed when all the following conditions are met. —The target vehicle stop position TD is set by the vehicle stop position setting unit 321. —The calculated value DR of the moving distance of the vehicle 10 is derived by the moving distance deriving unit 322. —The estimated value DV of the moving distance of the vehicle 10 is calculated by the moving distance estimation unit 324.

Figure 5:
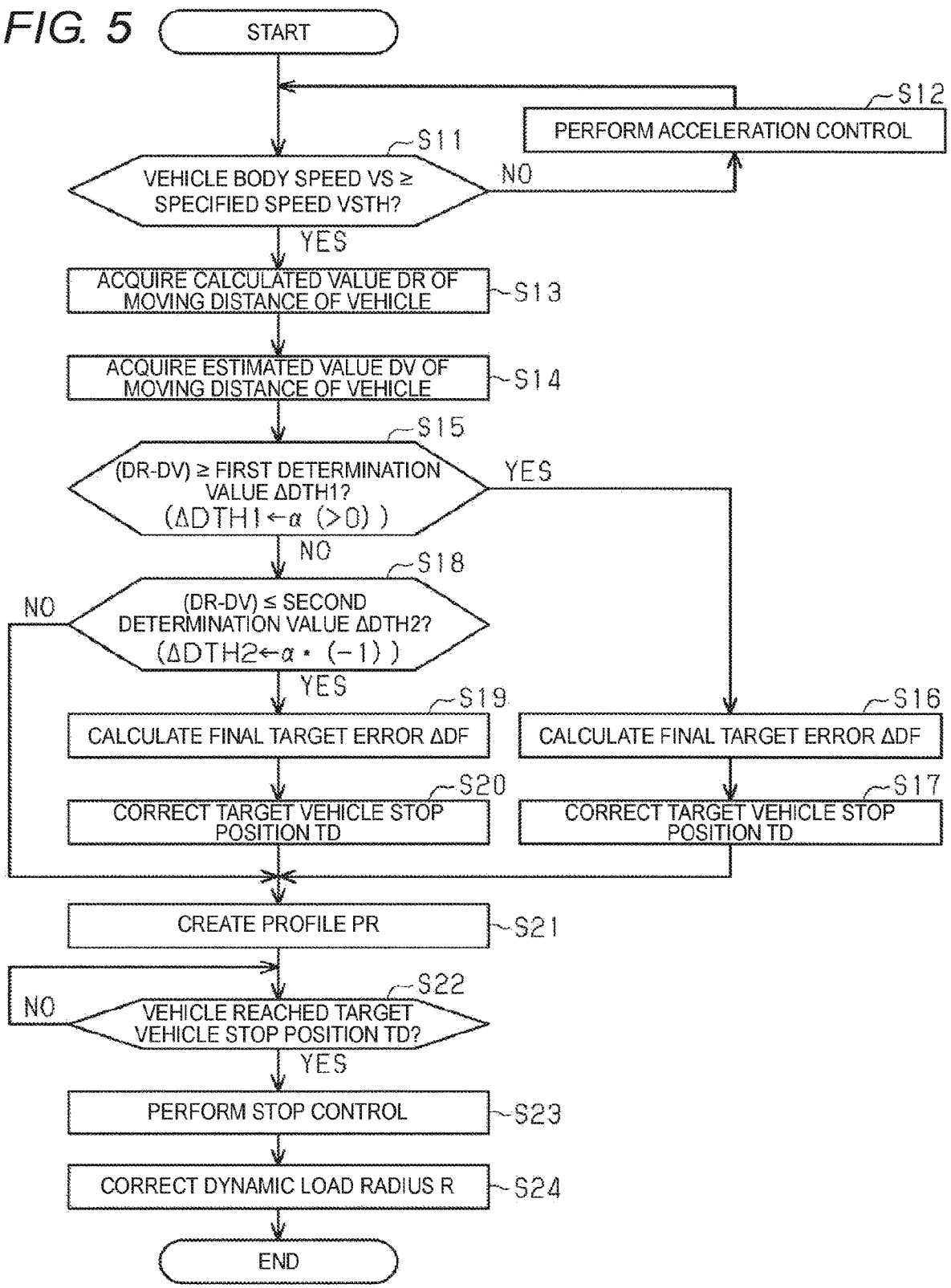
FIG. 5 is a flowchart for explaining a processing routine executed to assist the stoppage of the vehicle.

As shown in FIG. 5, in the present processing routine, in the first step S11, the correction unit 325 determines whether or not the vehicle body speed VS of the vehicle is greater than or equal to a specified speed VSTH. For example, the vehicle body speed VS can be derived based on the wheel speed VW of at least one of the wheels FL, FR, RL, and RR. The wheel speed VW is calculated based on pulse signals output from the wheel speed sensors 21fl, 21fr, 21rl, 21rr.

In a state where the rotational speeds of the wheels FL, FR, RL, and RR are low and the vehicle body speed VS is low, it is difficult to detect the pulses included in the pulse signals from the wheel speed sensors 21fl, 21fr, 21rl, and 21rr. Therefore, the calculation accuracy of the estimated value DV of the moving distance of the vehicle 10 using the number of pulses included in the pulse signal from the specified wheel speed sensor 21 tends to be low. On the other hand, in a state where the vehicle body speed VS is large to some extent, the rotational speed of the wheels FL, FR, RL, and RR is somewhat large, and thus the detection performance of pulses included in the pulse signals from the wheel speed sensors 21fl, 21fr, 21rl, and 21rr does not degrade. Therefore, the estimated value DV of the moving distance of the vehicle 10 can be calculated with high accuracy. Therefore, the specified speed VSTH is set as a criterion for determining whether or not the vehicle 10 is traveling at a speed of an extent the estimated value DV of the moving distance of the vehicle 10 can be calculated with high accuracy.

The process proceeds to step S12 When the vehicle body speed VS is less than the specified speed VSTH (NO) in step S11, and in step S12, the drive control unit 33 performs an acceleration control of accelerating the vehicle 10 so that the vehicle body speed VS becomes greater than or equal to the specified speed VSTH. Thus, when the acceleration control is performed by the drive control unit 33, a process again proceeds to step S11.

On the other hand, when the vehicle body speed VS is greater than or equal to the specified speed VSTH (YES) in step S11, the process proceeds to the next step S13. In step S13, the correction unit 325 acquires the calculated value DR of the moving distance of the vehicle 10 derived by the moving distance deriving unit 322. In the next step S14, the correction unit 325 acquires the estimated value DV of the moving distance of the vehicle 10 calculated by the moving distance estimation unit 324. Subsequently, in the next step S15, the correction unit 325 obtains a difference obtained by subtracting the estimated value DV of the moving distance from the calculated value DR of the moving distance of the vehicle 10, and determines whether or not the difference is greater than or equal to a first determination value $\Delta$DTH1.

The first determination value $\Delta$DTH1 is set to a specified value $\alpha$, which is a value larger than "0". The specified value $\alpha$ is set to a value with which whether or not the difference between the calculated value DR of the moving distance and the estimated value DV of the moving distance of the vehicle 10 is within an error range. That is, when the difference obtained by subtracting the estimated value DV of the moving distance from the calculated value DR of the moving distance of the vehicle 10 is less than the first determination value $\Delta$DTH1, the correction unit 325 can determine that the estimated value DV of the moving distance of the vehicle 10 has a possibility of being equivalent to the calculated value DR of the moving distance. On the other hand, when the difference obtained by subtracting the estimated value DV of the moving distance from the calculated value DR of the moving distance of the vehicle 10 is greater than or equal to the first determination value $\Delta$DTH1, the correction unit 325 can determine that the estimated value DV of the moving distance of the vehicle 10 is smaller than the calculated value DR of the moving distance.

Therefore, when the difference obtained by subtracting the estimated value DV of the moving distance from the calculated value DR of the moving distance of the vehicle 10 is greater than or equal to the first determination value $\Delta$DTH1 (S15: YES), the correction unit 325 corrects the target vehicle stop position TD toward a side of moving closer to the vehicle 10. That is, in step S16, the correction unit 325 calculates the final target error $\Delta$DF using the calculated value DR of the moving distance and the estimated value DV of the moving distance of the vehicle 10. At this time, the final target error $\Delta$DF is increased as the difference between the calculated value DR of the moving distance and the estimated value DV of the moving distance of the vehicle 10 becomes larger. For example, the correction unit 325 can calculate the final target error $\Delta$DF by using the following relational expression (equation 2). This final target error $\Delta$DF is the difference between the target vehicle stop position TD in control and the actual target vehicle stop position. Note that "LD" in the relational expression (equation 2) is a distance from the current position of the vehicle 10 to the target vehicle stop position TD as shown in FIG. 3.

[Equation 2]

$$\frac{DR}{LD} = \frac{DV}{LD - \Delta DF} \qquad \text{(Equation 2)}$$

After the final target error $\Delta$DF is calculated in this manner, the process proceeds to the next step S17. In step S17, the correction unit 325 corrects the target vehicle stop position TD so as to bring the target vehicle stop position TD closer to the vehicle 10 by the final target error $\Delta$DF calculated in step S16. Thereafter, the process proceeds to step S21 to be described later.

On the other hand, when the difference obtained by subtracting the estimated value DV of the moving distance from the calculated value DR of the moving distance of the vehicle 10 is less than the first determination value $\Delta$DTH1 in step S15 (NO), the process proceeds to the next step S18. In step S18, the correction unit 325 determines whether or not a difference obtained by subtracting the estimated value DV of the moving distance from the calculated value DR of the moving distance of the vehicle 10 is less than or equal to a second determination value $\Delta$DTH2.

The second determination value ΔDTH2 is set to a value obtained by multiplying "−1" to the specified value α. Therefore, when the difference obtained by subtracting the estimated value DV of the moving distance from the calculated value DR of the moving distance of the vehicle 10 is greater than the second determination value ΔDTH2, the correction unit 325 can determine that the estimated value DV of the moving distance of the vehicle 10 is equal to the calculated value DR of the moving distance. On the other hand, when the difference obtained by subtracting the estimated value DV of the moving distance from the calculated value DR of the moving distance of the vehicle 10 is less than or equal to the second determination value ΔDTH2, the correction unit 325 can determine that the estimated value DV of the moving distance of the vehicle 10 is greater than the calculated value DR of the moving distance.

Therefore, when the difference obtained by subtracting the estimated value DV of the moving distance from the calculated value DR of the moving distance of the vehicle 10 is larger than the second determination value ΔDTH2 (S18: NO), the process proceeds to step S21 to be described later. That is, the target vehicle stop position TD is not corrected.

On the other hand, when the difference obtained by subtracting the estimated value DV of the moving distance from the calculated value DR of the moving distance of the vehicle 10 is less than or equal to than the second determination value ΔDTH2 (S18: YES), the correction unit 325 corrects the target vehicle stop position TD toward a side of moving away from the vehicle 10. That is, in step S19, the correction unit 325 calculates the final target error ΔDF using the calculated value DR of the moving distance and the estimated value DV of the moving distance of the vehicle 10. At this time, the final target error ΔDF is increased as the difference between the calculated value DR of the moving distance and the estimated value DV of the moving distance of the vehicle 10 becomes larger. For example, the correction unit 325 can calculate the final target error ΔDF by using the relational expression (equation 2) above.

After the final target error ΔDF is calculated, the process proceeds to the next step S20. In step S20, the correction unit 325 corrects the target vehicle stop position TD so as to bring the target vehicle stop position TD farther from the vehicle 10 by the final target error ΔDF calculated in step S19. Thereafter, the process proceeds to step S21 to be described later.

In step S21, the norm setting unit 326 sets a profile PR of the moving distance of the vehicle 10 as shown in FIG. 4 based on the set target vehicle stop position TD. That is, when both the determination result of step S15 and the determination result of step S18 are "NO", the profile PR (PR1) is set based on the target vehicle stop position TD set by the vehicle stop position setting unit 321. On the other hand, when either one of the determination result of step S15 and the determination result of step S18 is "YES", the profile PR (PR2 or PR3) is set based on the target vehicle stop position TD corrected by the correction unit 325. After the profile PR is set in this manner, the process proceeds to the next step S22.

In step S22, the brake control unit 34 determines whether or not the vehicle 10 traveling according to the set profile PR has reached the target vehicle stop position TD. That is, the brake control unit 34 calculates the moving distance DVA of the vehicle 10 from the time point when the profile PR is set using the following relational expression (equation 3). Note that "Pa" in the relational expression (equation 3) is the number of detected pulses from the time point when the profile PR is set from among the pulse signals input from the wheel speed sensor 21. That is, "Pa" corresponds to the rotation amount of the specified wheel from the time point when the profile PR is set. Therefore, it can be said that the moving distance DVA of the vehicle 10 calculated here is a value calculated based on the rotation amount of the specified wheel from the time point when the profile PR is set.

[Equation 3]

$$DV = 2 \cdot \pi \cdot R \cdot \frac{Pa}{N} \qquad \text{(Equation 3)}$$

Subsequently, the brake control unit 34 determines whether or not the vehicle 10 has reached the target vehicle stop position TD based on the moving distance DVA of the vehicle 10 calculated using the relational expression (equation 3). When it is not determined that the vehicle 10 has reached the target vehicle stop position TD (S22: NO), the brake control unit 34 repeatedly performs the determination process of step S22. On the other hand, when it is determined that the vehicle 10 has reached the target vehicle stop position TD (S22: YES), the process proceeds to the next step S23. In step S23, the brake control unit 34 performs the stop control described above.

Then, when the vehicle 10 stops by the execution of the stop control, the process proceeds to the next step S24. In step S24, the update unit 327 acquires a difference obtained by subtracting the estimated value DV of the moving distance from the calculated value DR of the moving distance of the vehicle 10 from the correction unit 325, and based on the difference, corrects the dynamic load radius R of the specified wheel. That is, the update unit 327 can calculate the radius error ΔR by using the following relational expression (equation 4). Note that "ΔDV" in the relational expression (equation 4) is a difference obtained by subtracting the estimated value DV of the moving distance from the calculated value DR of the moving distance of the vehicle 10. Furthermore, the value of "Pn" when the estimated value DV of the moving distance of the vehicle 10 is calculated using the above relational expression (equation 1) is substituted for "Pn".

[Equation 4]

$$\Delta DV = 2 \cdot \pi \cdot \Delta R \cdot \frac{Pn}{N} \qquad \text{(Equation 4)}$$

When the difference ΔDV is a negative value, the radius error ΔR is also a negative value. A case where the difference ΔDV is a negative value means that the actual dynamic load radius of the specified wheel is larger than the dynamic load radius R stored in the storage unit 323. On the other hand, when the difference ΔDV is a positive value, the radius error ΔR is also a positive value. A case where the difference ΔDV is a positive value means that the actual dynamic load radius of the specified wheel is smaller than the dynamic load radius R stored in the storage unit 323.

Therefore, the update unit 327 corrects the dynamic load radius R using the following relational expression (equation 5). Thus, when the difference ΔDV is a negative value, the update unit 327 can increase and correct the dynamic load radius R stored in the storage unit 323. On the other hand, when the difference ΔDV is a positive value, the update unit 327 can reduce and correct the dynamic load radius R stored in the storage unit 323.

[Equation 5]

$$R \leftarrow R - \Delta DV \quad \text{(Equation 5)}$$

After the storage contents of the storage unit 323 are updated in this way, present processing routine is ended.

When the target vehicle stop position TD set by the vehicle stop position setting unit 321 is not corrected, the difference ΔDV can be regarded as substantially equal to "0", and thus the dynamic load radius R of the specified wheel is not corrected in step S24.

Next, the operation when stopping the vehicle 10 moving backward will be described together with effects.

When the vehicle is moving backward, the calculated value DR of the moving distance of the vehicle 10 is derived based on the information obtained by the rear monitoring system 23. Furthermore, the estimated value DV of the moving distance of the vehicle 10 is calculated based on the pulse signal from the specified wheel speed sensor 21 and the dynamic load radius R of the specified wheel stored in the storage unit 323. At this time, if the dynamic load radius R stored in the storage unit 323 is different from the actual dynamic load radius of the specified wheel, the difference ΔDV obtained by subtracting the estimated value DV of the moving distance from the calculated value DR of the moving distance may be greater than or equal to the first determination value ΔDTH1 or may be less than or equal to the second determination value ΔDTH2. In such a case, in the present embodiment, the target vehicle stop position TD set by the vehicle stop position setting unit 321 is corrected.

Specifically, when the difference ΔDV is greater than or equal to the first determination value ΔDTH1, the actual dynamic load radius is smaller than the dynamic load radius R stored in the storage unit 323, and thus the target vehicle stop position TD is corrected toward the side of moving closer to the vehicle 10. When determined that the vehicle 10 has reached the target vehicle stop position TD using the corrected target vehicle stop position TD and the moving distance DVA of the vehicle 10 calculated using the pulse signal output from the specified wheel speed sensor 21, the vehicle 10 is stopped by the execution of the stop control. In other words, the vehicle 10 can be stopped when determination can be determined that the vehicle 10 has reached the corrected target vehicle stop position TD.

Here, the uncorrected target vehicle stop position TD is a value set based on the information obtained by the rear monitoring system 23. Therefore, if the dynamic load radius R of the specified wheel stored in the storage unit 323 is deviated from the actual dynamic load radius, when determined that the vehicle 10 has reached the target vehicle stop position TD using the uncorrected target vehicle stop position TD and the moving distance DVA of the vehicle 10 and the stop control is performed, the vehicle 10 comes to a stop by the execution of the stop control after the vehicle 10 has passed a position where the vehicle is originally intended to be stopped.

On the other hand, in the present embodiment, whether or not the vehicle 10 has reached the target vehicle stop position TD is determined using the target vehicle stop position TD corrected based on the difference ΔDV and the moving distance DVA of the vehicle 10. Thus, the deviation between the position where the vehicle 10 is originally intended to be stopped and the position where the vehicle 10 actually stops by the execution of stop control can be suppressed from increasing.

Furthermore, when the difference ΔDV is less than or equal to the second determination value ΔDTH2, the actual dynamic load radius is larger than the dynamic load radius R stored in the storage unit 323, and thus the target vehicle stop position TD is corrected toward the side of moving away from the vehicle 10. When determined that the vehicle 10 has reached the target vehicle stop position TD using the corrected target vehicle stop position TD and the moving distance DVA of the vehicle 10 calculated using the pulse signal output from the specified wheel speed sensor 21, the vehicle 10 is stopped by the execution of the stop control. In other words, the vehicle 10 can be stopped when determination can be determined that the vehicle 10 has reached the corrected target vehicle stop position TD.

Here, when determined that the vehicle 10 has reached the target vehicle stop position TD using the uncorrected target vehicle stop position TD and the moving distance DVA of the vehicle 10, and the stop control is performed, the vehicle 10 is stopped by the execution of the stop control before the position where the vehicle 10 is originally intended to be stopped.

On the other hand, in the present embodiment, whether or not the vehicle 10 has reached the target vehicle stop position TD is determined using the target vehicle stop position TD corrected based on the difference ΔDV and the moving distance DVA of the vehicle 10. Thus, the deviation between the position where the vehicle 10 is originally intended to be stopped and the position where the vehicle 10 actually stops by the execution of stop control can be suppressed from increasing.

Next, the operation when stopping the vehicle 10 moving forward will be described together with effects.

When the vehicle is moving forward, the calculated value DR of the moving distance of the vehicle 10 is derived based on the information obtained by the front monitoring system 22. Furthermore, the estimated value DV of the moving distance of the vehicle 10 is calculated based on the pulse signal from the specified wheel speed sensor 21 and the dynamic load radius R of the specified wheel stored in the storage unit 323. At this time, if the dynamic load radius R stored in the storage unit 323 is different from the actual dynamic load radius of the specified wheel, the difference ΔDV obtained by subtracting the estimated value DV of the moving distance from the calculated value DR of the moving distance may be greater than or equal to the first determination value ΔDTH1 or may be less than or equal to the second determination value ΔDTH2. In such a case, in the present embodiment, the target vehicle stop position TD set by the vehicle stop position setting unit 321 is corrected.

Specifically, when the difference ΔDV is greater than or equal to the first determination value ΔDTH1, the actual dynamic load radius is smaller than the dynamic load radius R stored in the storage unit 323, and thus the target vehicle stop position TD is corrected toward the side of moving closer to the vehicle 10. When determined that the vehicle 10 has reached the target vehicle stop position TD using the corrected target vehicle stop position TD and the moving distance DVA of the vehicle 10 calculated using the pulse signal output from the specified wheel speed sensor 21, the vehicle 10 is stopped by the execution of the stop control. In other words, the vehicle 10 can be stopped when determination can be determined that the vehicle 10 has reached the corrected target vehicle stop position TD. In this way, the deviation between the position where the vehicle 10 is originally to be stopped and the position where the vehicle 10 actually stops by the execution of the stop control can be suppressed from increasing by using a target value (i.e., corrected target vehicle stop position TD) in control that takes into account the deviation between the dynamic load radius R of the specified wheel stored in the storage unit 323 and the actual dynamic load radius.

Furthermore, when the difference ΔDV is less than or equal to the second determination value ΔDTH2, the actual dynamic load radius is larger than the dynamic load radius R stored in the storage unit 323, and thus the target vehicle stop position TD is corrected toward the side of moving away from the vehicle 10. When determined that the vehicle 10 has reached the target vehicle stop position TD using the corrected target vehicle stop position TD and the moving distance DVA of the vehicle 10 calculated using the pulse signal output from the specified wheel speed sensor 21, the vehicle 10 is stopped by the execution of the stop control. In other words, the vehicle 10 can be stopped when determination can be determined that the vehicle 10 has reached the corrected target vehicle stop position TD. In this way, the deviation between the position where the vehicle 10 is originally to be stopped and the position where the vehicle 10 actually stops by the execution of the stop control can be suppressed from increasing by using a target value (i.e., corrected target vehicle stop position TD) in control that takes into account the deviation between the dynamic load radius R of the specified wheel stored in the storage unit 323 and the actual dynamic load radius.

Furthermore, according to the present embodiment, the operation effect shown below can further be acquired.

(1) When correcting the target value, which is appropriately while the vehicle 10 is heading to the position where the vehicle 10 is originally intended to be stopped based on the above difference ΔDV (=DR-DV), the acceleration of the vehicle may fluctuate by the sudden change in the control amount necessary for the traveling of the vehicle 10, which may cause discomfort to the passenger of the vehicle 10. In this regard, in the present embodiment, the target vehicle stop position TD that is the final target value is corrected based on the difference ΔDV. Therefore, the acceleration of the vehicle 10 is less likely to fluctuate as the control amount can be prevented from changing suddenly while the vehicle 10 is traveling toward the position where the vehicle 10 is originally intended to be stopped. Therefore, it is possible to automatically stop the vehicle 10 at a position where it is originally intended to be stopped while suppressing discomfort to the passenger of the vehicle 10.

(2) In addition, consideration is also made to a method of correcting the dynamic load radius R stored in the storage unit 323 instead of correcting the target vehicle stop position TD using the difference ΔDV (=DR-DV) while the vehicle 10 is moving toward the target vehicle stop position TD. In this case, whether or not the vehicle 10 has reached the target vehicle stop position TD set by the vehicle stop position setting unit 321 is determined using the moving distance DVA of the vehicle 10 calculated using the corrected dynamic load radius R. Thus, by changing the parameter (dynamic load radius R) during the traveling of the vehicle 10 in this way, the acceleration of the vehicle 10 traveling according to the profile PR may suddenly change, which may cause discomfort to the passengers of the vehicle 10. In this regard, in the present embodiment, the dynamic load radius R is not changed during the traveling of the vehicle, and thus fluctuations in the acceleration of the vehicle 10 traveling according to the profile PR can be suppressed. Therefore, it is possible to automatically stop the vehicle 10 at a position where it is originally intended to be stopped while suppressing discomfort to the passenger of the vehicle 10.

(3) In determining whether or not the vehicle 10 has reached the target vehicle stop position TD, a value calculated based on the pulse signal from the specified wheel speed sensor 21 is adopted instead of a value calculated based on the information obtained by the monitoring systems 22, 23 for the moving distance DVA of the vehicle 10. This is because the update frequency of the value calculated based on the pulse signal from the specified wheel speed sensor 21 is higher than the update frequency of the value calculated based on the information obtained by the monitoring systems 22 and 23. Then, the effect of suppressing the deviation that occurs between the position where the vehicle 10 is originally intended to be stopped and the actual stop position of the vehicle 10 from increasing can be further enhanced by performing the stop control when determined that the vehicle 10 has reached the target vehicle stop position TD using the value of high update frequency, that is, the moving distance DVA (4) In the present embodiment, the dynamic load radius R stored in the storage unit 323 is corrected after the stop control is performed. The deviation between the dynamic load radius R stored in the storage unit 323 and the actual dynamic load radius of the specified wheel is thus small, and the performance of the traveling control of the subsequent vehicle 10 can be enhanced.

The embodiment described above may be modified to a different embodiment as described below.

The process of correcting the dynamic load radius R of the specified wheel stored in the storage unit 323 may be omitted.

The calculation of the estimated value DV of the moving distance of the vehicle 10 and the derivation of the calculated value DR of the moving distance may be performed regardless of whether the vehicle body speed VS of the vehicle 10 is greater than or equal to the specified speed VSTH. When the vehicle body speed VS is less than the specified speed VSTH, there is a concern that the calculation of the estimated value DV of the moving distance of the vehicle 10 may lower. Therefore, when the difference (=|DR-DV|) between the calculated value DR of the moving distance of the vehicle 10 and the estimated value DV of the moving distance is too large, the target vehicle stop position TD may not be corrected. If the target vehicle stop position TD is not corrected for such a reason, whether or not the vehicle 10 has reached the target vehicle stop position TD may be determined based on the information obtained by the monitoring systems 22 and 23 and the target vehicle stop position TD.

The information stored in the storage unit 323 may not be the dynamic load radius R of the specified wheel and may be a value correlated with the dynamic load radius R. For example, the value correlated with the dynamic load radius R may be the diameter of the specified wheel, or the radius of the specified wheel when the vehicle 10 is stopped. When the diameter of the specified wheel is stored, in the calculation of the estimated value DV of the moving distance of the vehicle 10, the radius of the specified wheel may be obtained from the diameter of the specified wheel stored in the storage unit 323, and the estimated value DV of the moving distance may be calculated using the radius.

The calculation (e.g., calculation of wheel speed VW) using pulse signals from wheel speed sensors 21$fl$, 21$fr$, 21$rl$, 21$rr$ is performed using the number of pulses included in the pulse signal (specifically, the number of rising edges, or the number of falling edges). However, in the correction of the target vehicle stop position TD and the determination of the execution timing of the stop control, both numbers, the number of rising edges and the number of falling edges, may be used to calculate the estimated value DV of the moving distance of the vehicle 10 and the moving distance DVA of the vehicle 10.

In the embodiment described above, the estimated value DV of the moving distance of the vehicle 10 and the moving distance DVA of the vehicle 10 are calculated based on the rotation amount of any one of the wheels FL, FR, RL, RR, that is, the pulse signal from the wheel speed sensor 21 corresponding to the relevant wheel. However, the present invention is not limited thereto, and the estimated value DV of the moving distance of the vehicle 10 and the moving distance DVA of the vehicle 10 may be calculated based on the rotation amounts of the plurality of wheels.

The stop control may apply braking force to the vehicle 10 from when the vehicle 10 is traveling according to the set profile PR so that the vehicle stops at the time point determination is made that the vehicle 10 has reached the target vehicle stop position TD. In this case, the stop control may be performed from the time point the profile PR is created, or the stop control may be performed after the time point the profile PR is created. As the braking force on the vehicle 10 is controlled from when the vehicle 10 is traveling according to the profile PR in such a manner, even if the profile PR is created in a state the vehicle body speed VS is relatively large, the deviation between the position where the vehicle 10 is originally intended to be stopped and the actual stop position of the vehicle 10 can be reduced.

The stoppage assistance control for assisting the stoppage of the vehicle 10 may be a control different from the stop control described in the above embodiment. For example, the stoppage assistance control may be control for requesting the driver of the vehicle 10 to perform a braking operation when it can be determined that the vehicle 10 has reached the target vehicle stop position TD. A method of requesting a braking operation includes, for example, a request for a braking operation by sound using a speaker or the like, and a request for a braking operation by display using a display screen in a passenger compartment.

The vehicle 10 may be a vehicle provided with an imaging device that monitors the lower side and an imaging device that monitors the side as a monitoring system that monitors the periphery of the vehicle 10. In this case, information obtained by each of these imaging devices may also be used when setting the target vehicle stop position TD and deriving the calculated value DR of the moving distance of the vehicle 10.

The vehicle 10 to which the control device 30 is applied may have only an electric motor as a power source, or may have only an engine as a power source. Furthermore, the vehicle 10 may be a hybrid vehicle having both an electric motor and an engine as power sources.

The invention claimed is:

1. A vehicle stoppage assistance apparatus for a vehicle including a monitoring system that monitors a periphery of the vehicle and a wheel speed sensor that outputs a pulse signal corresponding to a rotated angle of a wheel, the vehicle stoppage assistance apparatus comprising:
    a storage unit that stores a radius of the wheel or a correlation value of the radius;
    a moving distance estimation unit that calculates an estimated value of a moving distance of the vehicle in a specified time based on a number of pulses included in the pulse signal input from the wheel speed sensor within the specified time and the radius of the wheel;
    a moving distance deriving unit that derives a calculated value of the moving distance of the vehicle in the specified time based on information obtained by the monitoring system that monitors the periphery of the vehicle;
    a vehicle stop position setting unit that sets a target vehicle stop position, which is a target of a stop position of the vehicle, based on the information obtained by the monitoring system that monitors the periphery of the vehicle;
    a correction unit that corrects the target vehicle stop position set by the vehicle stop position setting unit toward a side of moving closer to the vehicle when the calculated value of the moving distance is greater than the estimated value of the moving distance, and corrects the target vehicle stop position toward a side of moving away from the vehicle when the calculated value of the moving distance is smaller than the estimated value of the moving distance; and
    an assistance control unit that performs a stoppage assistance control of assisting stoppage of the vehicle so that the vehicle stops when the assistance control unit determines that the vehicle has reached the target vehicle stop position based on the moving distance of the vehicle, calculated on a basis of the pulse signal input from the wheel speed sensor, and the target vehicle stop position.

2. The vehicle stoppage assistance apparatus according to claim 1, wherein after the target vehicle stop position is set by the vehicle stop position setting unit, the correction unit corrects the target vehicle stop position based on the estimated value of the moving distance and the calculated value of the moving distance when the vehicle is traveling at greater than or equal to a specified speed.

3. The vehicle stoppage assistance apparatus according to claim 2, further comprising an update unit that updates the radius of the wheel or the correlation value of the radius stored in the storage unit on a basis of a difference obtained by subtracting the estimated value of the moving distance from the calculated value of the moving distance after the stoppage assistance control is performed by the assistance control unit.

4. The vehicle stoppage assistance apparatus according to claim 2, wherein an execution cycle of a process using the pulse signal output from the wheel speed sensor is shorter than a cycle of a process using the information obtained by the monitoring system.

5. The vehicle stoppage assistance apparatus according to claim 2, further comprising a drive control unit that drives a motor of the vehicle,
    wherein, after the target vehicle stop position is set by the vehicle stop position setting unit and the vehicle is not traveling at greater than or equal to the specified speed, the drive control unit performs an acceleration control of accelerating the vehicle so that the vehicle is driven to travel at greater than or equal to the specified speed before the correction unit corrects the target vehicle stop position.

6. The vehicle stoppage assistance apparatus according to claim 1, further comprising an update unit that updates the radius of the wheel or the correlation value of the radius stored in the storage unit on a basis of a difference obtained by subtracting the estimated value of the moving distance from the calculated value of the moving distance after the stoppage assistance control is performed by the assistance control unit.

7. The vehicle stoppage assistance apparatus according to claim 6, wherein an execution cycle of a process using the pulse signal output from the wheel speed sensor is shorter than a cycle of a process using the information obtained by the monitoring system.

8. The vehicle stoppage assistance apparatus according to claim 1, wherein an execution cycle of a process using the pulse signal output from the wheel speed sensor is shorter than a cycle of a process using the information obtained by the monitoring system.

9. A control device for a vehicle including a monitoring system that monitors a periphery of the vehicle and a wheel speed sensor that outputs a pulse signal corresponding to a rotated angle of a wheel, the control device comprising:
a processor programmed to:
store a radius of the wheel or a correlation value of the radius;
calculate an estimated value of a moving distance of the vehicle in a specified time based on a number of pulses included in the pulse signal input from the wheel speed sensor within the specified time and the radius of the wheel;
derive a calculated value of the moving distance of the vehicle in the specified time based on information obtained by the monitoring system that monitors the periphery of the vehicle;
set a target vehicle stop position, which is a target of a stop position of the vehicle, based on the information obtained by the monitoring system that monitors the periphery of the vehicle;
correct the target vehicle stop position toward a side of moving closer to the vehicle when the calculated value of the moving distance is greater than the estimated value of the moving distance,
correct the target vehicle stop position toward a side of moving away from the vehicle when the calculated value of the moving distance is smaller than the estimated value of the moving distance; and
perform a stoppage assistance control of assisting stoppage of the vehicle so that the vehicle stops when processor determines that the vehicle has reached the target vehicle stop position based on the moving distance of the vehicle, calculated on a basis of the pulse signal input from the wheel speed sensor, and the target vehicle stop position.

10. The control device according to claim 9, wherein after the target vehicle stop position is set, the processor is configured to correct the target vehicle stop position based on the estimated value of the moving distance and the calculated value of the moving distance when the vehicle is traveling at greater than or equal to a specified speed.

11. The control device according to claim 10, wherein the processor is programmed to update the radius of the wheel or the correlation value of the radius on a basis of a difference obtained by subtracting the estimated value of the moving distance from the calculated value of the moving distance after the stoppage assistance control is performed.

12. The control device according to claim 10, wherein an execution cycle of a process using the pulse signal output from the wheel speed sensor is shorter than a cycle of a process using the information obtained by the monitoring system.

13. The control device according to claim 10, wherein, after the target vehicle stop position is set and the vehicle is not traveling at greater than or equal to the specified speed, the processor is programmed to perform an acceleration control of accelerating the vehicle so that the vehicle is driven to travel at greater than or equal to the specified speed before correcting the target vehicle stop position.

14. The control device according to claim 9, wherein the processor is programmed to update the radius of the wheel or the correlation value of the radius on a basis of a difference obtained by subtracting the estimated value of the moving distance from the calculated value of the moving distance after the stoppage assistance control is performed.

15. The control device according to claim 14, wherein an execution cycle of a process using the pulse signal output from the wheel speed sensor is shorter than a cycle of a process using the information obtained by the monitoring system.

16. The control device according to claim 9, wherein an execution cycle of a process using the pulse signal output from the wheel speed sensor is shorter than a cycle of a process using the information obtained by the monitoring system.

* * * * *